(12) United States Patent
Cataldi et al.

(10) Patent No.: US 7,428,819 B2
(45) Date of Patent: Sep. 30, 2008

(54) METHOD FOR THE OPERATION OF A COMPRESSOR OF A GAS TURBINE WITH EVAPORATIVE COOLING OF THE COMPRESSOR INDUCTION AIR

(75) Inventors: Giovanni Cataldi, Zurich (CH); Christian Faehndrich, Bonstetten (CH); Charles Matz, Neuenhof (CH)

(73) Assignee: ALSTOM Technology Ltd., Baden (CH)

( * ) Notice: Subject to any disclaimer, the term of this patent is extended or adjusted under 35 U.S.C. 154(b) by 191 days.

(21) Appl. No.: 11/562,482

(22) Filed: Nov. 22, 2006

(65) Prior Publication Data

US 2007/0084212 A1   Apr. 19, 2007

Related U.S. Application Data

(63) Continuation of application No. PCT/EP2005/052709, filed on Jun. 13, 2005.

(30) Foreign Application Priority Data

Jun. 22, 2004   (CH) ..................................... 1045/04

(51) Int. Cl.
  *F02C 3/30*  (2006.01)
  *F02C 7/143*  (2006.01)
(52) U.S. Cl. ........................................ 60/775; 60/39.3
(58) Field of Classification Search ................... 60/775, 60/39.53, 728, 39.3
  See application file for complete search history.

(56) References Cited

U.S. PATENT DOCUMENTS 5,463,873 A   11/1995  Early et al.

6,260,350 B1 *  7/2001  Horii et al. .................... 60/39.3

FOREIGN PATENT DOCUMENTS

| DE | 19913681 | 10/2000 |
|---|---|---|
| EP | 0889212 | 1/1999 |
| EP | 1203866 | 5/2002 |

(Continued)

OTHER PUBLICATIONS

PCT/EP2005/052709 IPER, English translation.*

(Continued)

*Primary Examiner*—Ted Kim
(74) *Attorney, Agent, or Firm*—Adam J. Cermak; Cermak Kenealy & Vaidya LLP

(57) ABSTRACT

In a method of operating a compressor of a gas turbine, where compressor air sucked in from the environment is cooled down by evaporation cooling before entering the compressor, before starting operation of the compressor, maximum possible temperature drops which could be achieved by evaporation cooling are determined dependent on different ambient conditions and/or are provided as a data set. These temperature drops are correlated with a compressor map containing maximum temperature distortions at different ambient conditions and different rotation frequencies of the compressor which have to be met in order to avoid pumping. The evaporation cooling is then only operated when current ambient condition result in a maximum possible temperature drop from which a predetermined fraction of between 50% and 100% does not exceed the maximum distortion which can be taken from the compressor map for these ambient conditions and the current rotation frequency of the compressor. Safe operation of the compressor can be achieved without the need or monitoring temperature distortions in the sucked in air stream.

6 Claims, 4 Drawing Sheets

FOREIGN PATENT DOCUMENTS

| | | |
|---|---|---|
| EP | 1231369 | 8/2002 |
| WO | WO03/058047 | 7/2003 |
| WO | WO2005/124125 | 12/2005 |

OTHER PUBLICATIONS

Search Report for Swiss Patent App. No. 1045/2004 (Sep. 1, 2004).

International Search Report for PCT Patent App. No. PCT/EP2005/052709 (Sep. 13, 2005).

International Preliminary Report on Patentability for PCT Patent App. No. PCT/EP2005/052709 (Sep. 13, 2006).

\* cited by examiner

METHOD FOR THE OPERATION OF A COMPRESSOR OF A GAS TURBINE WITH EVAPORATIVE COOLING OF THE COMPRESSOR INDUCTION AIR

This application is a Continuation of, and claims priority under 35 U.S.C. § 120 to, International application number PCT/EP2005/052709, filed 13 Jun. 2005, and claims priority therethrough under 35 U.S.C. § 119 to Swiss application number 01045/04, filed 22 Jun. 2004, the entireties of which are incorporated by reference herein.

BACKGROUND OF THE INVENTION

1. Field of the Invention

The invention under consideration relates to a method for operation of a compressor of a gas turbine, in which compressor air, which is inducted from the environment, is cooled by means of evaporative cooling before entry into the compressor.

During the operation of gas turbines, air which is inducted from the environment, is compressed in a compressor and fed to the gas turbine process. To increase the efficiency of the gas turbine it is known to additionally cool the inducted compressor air before entry into the compressor. This cooling takes place in many cases by injection of finest water droplets or water vapor into the air flow inducted by the compressor, which is cooled by the evaporation of the water.

The application of the evaporative cooling, however, can lead to temperature fluctuations in the inducted air flow, as a result of which the compressor is subjected to the risk of compressor surging. This compressor surging in serious cases can lead to destruction of plant components, and consequently, must be avoided in any event.

2. Brief Description of the Related Art

In known gas turbines, which operate with compressor induction air which is cooled by evaporative cooling, it is known to continually measure the temperature in the compressor induction air at different points during the operation. In this way, temperature fluctuations are identified, and in the event of a fluctuation amplitude being too high, the compressor can be shut down in the short term to avoid possible damage. For this purpose, corresponding maps are made available for each compressor, which indicate the limits of the temperature fluctuations which are specific to the compressor, above which a surging of the compressor can occur.

The temperature monitoring requires the use of a plurality of screened temperature sensors in the air induction pipe, and also associated hardware and software for the processing of the measurement signals. However, in these screened temperature sensors there is the problem that they frequently become wet in operation, and as a result of this, frequently provide erroneous measurements with temperature fluctuations which are ostensibly too high.

There remains a need, therefore, for a method for operation of a compressor of a gas turbine with compressor induction air which is cooled by means of evaporative cooling, which lessens the probability for erroneous warnings with a more reliable operation of the compressor, and which can be implemented cost effectively.

SUMMARY OF THE INVENTION

According to one aspect of the present invention, in the method under consideration for operation of a compressor of a gas turbine, in which compressor air which is inducted from the environment is cooled by means of evaporative cooling before entry into the compressor, maximum possible temperature drops by evaporative cooling are determined in dependence upon different environmental conditions, and/or made available as a data record, before putting the compressor into service. These temperature drops are related to a map of the compressor, from which are gatherable maximum temperature fluctuations to be observed at different environmental conditions and different RPMs of the compressor to avoid surging. The evaporative cooling during the method under consideration is only operated when the current environmental conditions produce a maximum possible temperature drop of which a predetermined fractional part, which lies between 50% and 100%, does not exceed the maximum temperature fluctuation gatherable from the map for these environmental conditions and for the current RPM of the compressor.

Methods embodying principles of the present invention, therefore, can completely manage without screened temperature sensors so that no erroneous warnings, which are conditional upon these, occur any more. By this, exemplary methods also manage without the necessary hardware and software for this temperature sensing system so that it can be realized more cost effectively. A protection of the compressor is, therefore, reliably achieved by the steps of the method by not operating the evaporative cooling at environmental conditions at which the temperature and the relative humidity of the environment exceeds or falls below, as the case may be, defined limiting value combinations of both variables. This limited operating range results from the determining of temperature fluctuations which occur in the worst case from the maximum possible temperature drop (or a fractional part of it) by the evaporative cooling at different environmental conditions. These temperature fluctuations are compared with the associated map of the compressor, from which are to be gathered the temperature fluctuations of the inducted compressor air at the corresponding environmental conditions and different RPMs of the compressor, which are the maximum tolerable for avoiding surging. If the fluctuation amplitude, which is achievable with the evaporative cooling at the current environmental- and RPM values, lies below the surge limit of the compressor, the compressor can then be safely operated with the evaporative cooling. If the amplitude lies outside this range, then the evaporative cooling is not operated or is shut down, as the case may be. By this procedure, the operating line of the compressor is limited, therefore, in dependence upon environmental conditions and RPM.

The determining of the maximum possible temperature drop by means of the evaporative cooling in dependence upon different environmental conditions, i.e., different ambient temperatures and different relative humidity, can be carried out computationally or by advance measurement. Tables and diagrams which are already in existence can also be consulted. In the method under consideration, use is also made of the maximum temperature drop achievable by evaporative cooling being as a rule greater than the temperature fluctuations induced in the inducted compressor air by means of it. The interrelationship between both variables, i.e., the fractional part of the temperature drop which corresponds to the resulting temperature fluctuation, can be empirically determined. In the exemplary methods of the present invention, preferably a value in the region of about 80% of the maximum possible temperature drop is set as the resulting temperature fluctuation.

Another aspect of methods of the present invention includes that the environmental conditions, i.e., the temperature and relative humidity of the environment, are continually recorded during the operation of the gas turbine, in order to shut down the evaporative cooling in the event of changes which can create a risk of surging of the compressor.

Preferably, such a shutting down of the evaporative cooling is also undertaken if the pressure of the medium which is supplied for the evaporative cooling, especially water, exceeds or falls below defined, predeterminable limiting values. Preferably, the shutting down is undertaken when the pressure in the feed line drops below $120*10^5$ Pa (120 bar), or rises above $180*10^5$ Pa (180 bar). In a further development, this shutting down also takes place if the mass flow of the medium which is supplied for evaporation differs by more than 5% of a predetermined rated mass flow.

A further aspect of methods of the present invention includes that the injection of the evaporative medium into the inducted compressor air flow is undertaken so that a symmetrical distribution within the cross section of the air induction pipe, and/or an injection which is weighted with regard to the local flow velocity of the inducted air for a maximum homogeneity of the saturated air flow, are achieved. The injection nozzles, in the last-mentioned case, are installed more closely in the air induction pipe in cross sectional regions of high flow velocity than in other regions, so that the continuity equation $$\dot{m}=\rho\chi\overline{V}\chi A$$

is satisfied.

BRIEF DESCRIPTION OF THE DRAWINGS

Aspects of the present invention are explained again in detail with reference to an exemplary embodiment according to the invention in conjunction with the drawings. In the drawings.

DETAILED DESCRIPTION OF EXEMPLARY EMBODIMENTS

Figure 1:
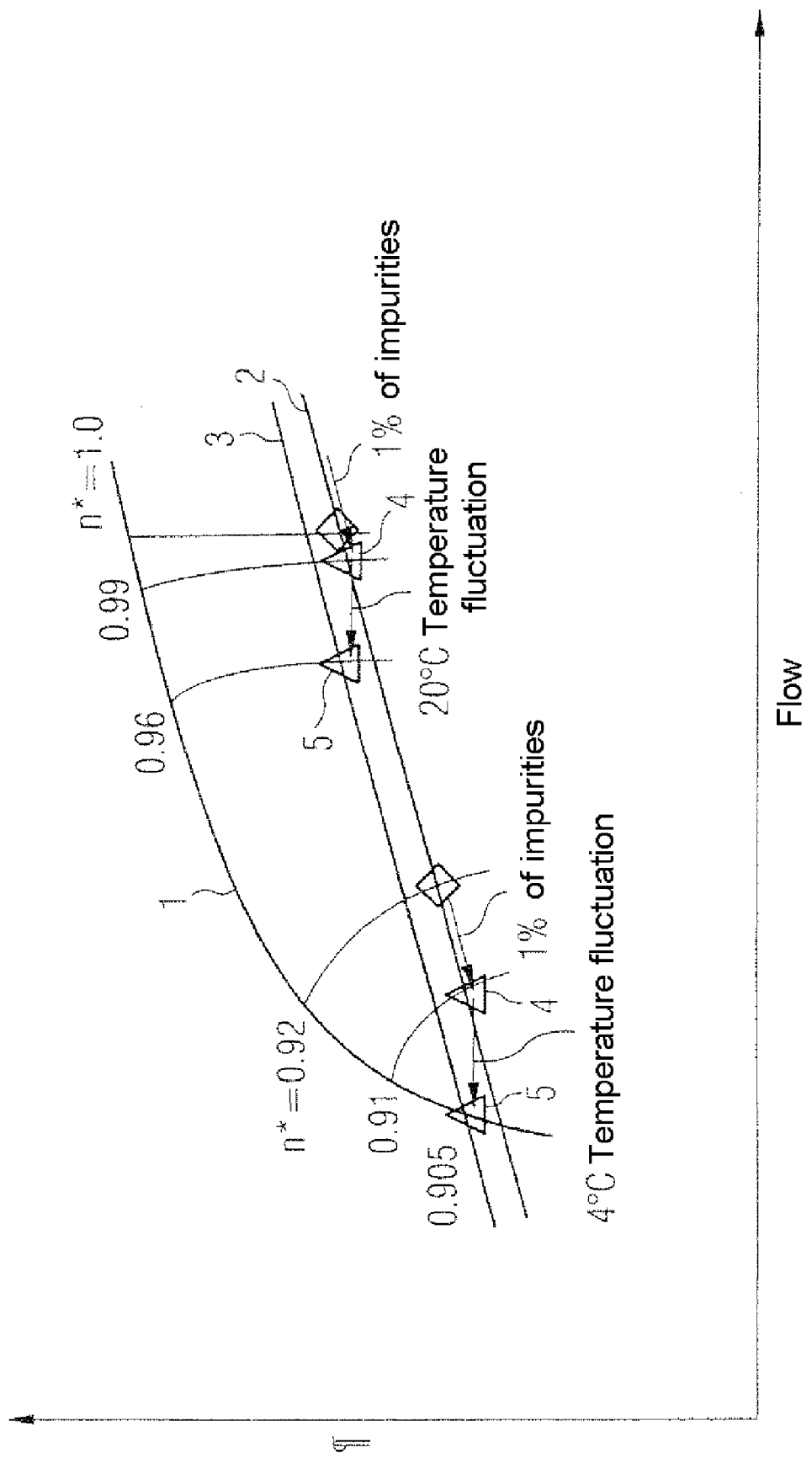
FIG. 1 shows an example for a map of a compressor with details of the surge limit, of the undisturbed operating line, and of the operating line which is shifted by temperature deviations.

FIG. 1 exemplarily shows a map of a compressor of a gas turbine, in which are drawn the surge limit 1, the undisturbed operating line 2 and also the operating line 3 which is shifted by temperature fluctuations. Furthermore, the lines of constant RPM of the compressor at different RPMs n* (as a fractional part of the rated RPM) are visible. Such a method of presentation is familiar to a person skilled in the art. In this connection, an operating characteristic, based on an operating point 4, is shown in the right hand section of the figure, in which the operating point by 1% contamination on the operating line 2 is shifted first to a somewhat reduced flow, and then by temperature fluctuations with a fluctuation amplitude of 20° C. is shifted onto an operating point 5 on the shifted operating line 3. From the map, it is evident that in this operating range there is no risk of surging since there is still a sufficient distance from the surge limit 1.

In a region of reduced flow, which is identifiable in the left hand section of FIG. 1, a fluctuation amplitude of the temperature of 4° C. already leads, however, to an operating point 5 on the shifted operating line 3 which lies upon the surge limit 1. Such an operating range must be prevented at all costs to avoid damage.

Figure 2:
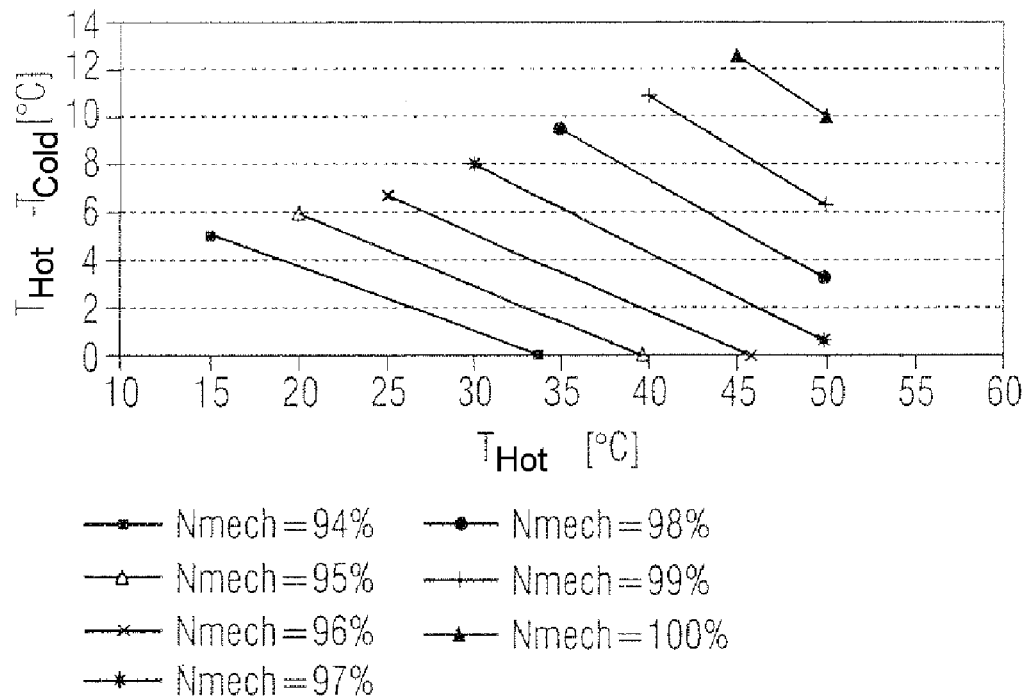
FIG. 2 shows an example for a map of a gas turbine, which specifies the maximum temperature fluctuations which are allowed to occur for avoiding surging at different RPMs of the compressor.

FIG. 2 shows a typical map of a compressor in which are entered the temperature fluctuations which are the maximum tolerable for avoiding surging in dependence upon different RPMs of the compressor (in a percentage of the rated speed), as can be produced by mains fluctuations. The maximum tolerable temperature fluctuations, in addition to the RPM, are also dependent upon the ambient temperature, i.e., the temperature without evaporative cooling. In known gas turbines, the temperatures at different points are continually monitored by the arrangement of temperature sensors in the air induction pipe, in order to detect in good time an exceeding of the maximum tolerable temperature fluctuations which are entered in such a map.

According to the method under consideration, it was recognized that such a monitoring is no longer necessary if the maximum possible temperature fluctuations, which are achievable by the applied evaporative cooling in predetermined environmental conditions, are smaller than the maximum tolerable temperature fluctuations in these environmental conditions. The maximum possible temperature fluctuation corresponds to the difference between the ambient temperature and the wet-bulb temperature with a predetermined relative air humidity.

Figure 3:
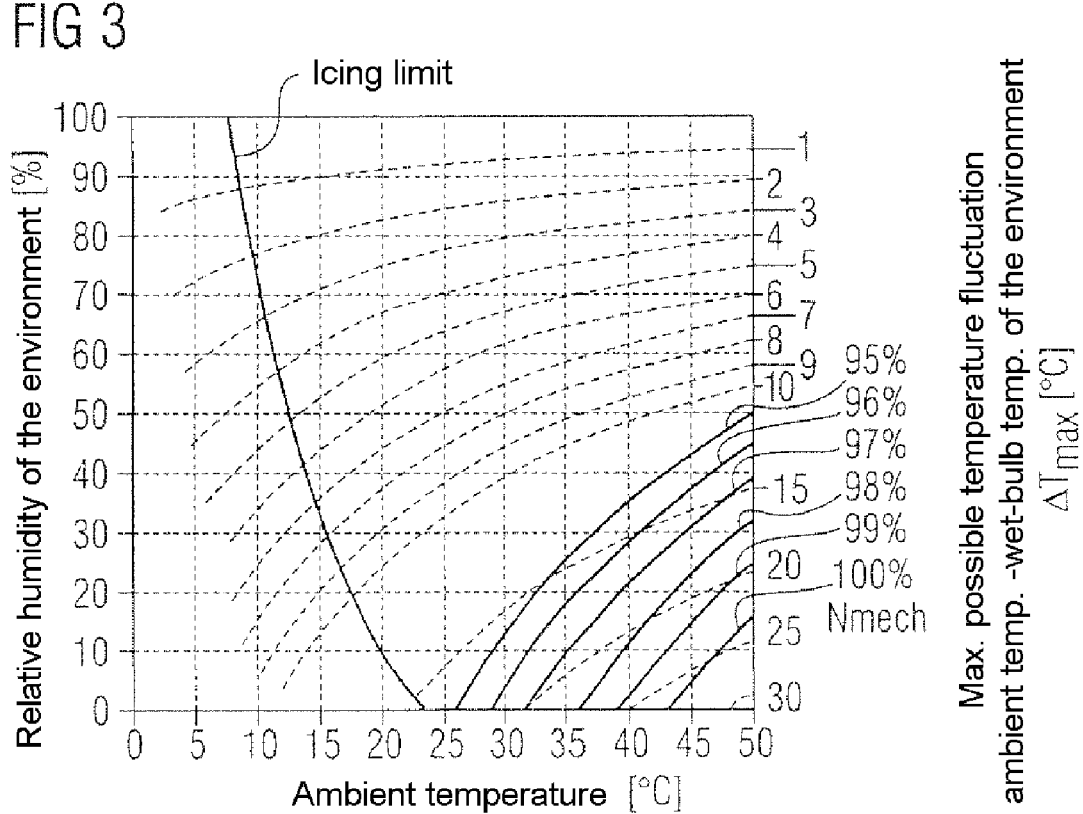
FIG. 3 shows an example for the limitation of the operating range of the evaporative cooling according to the method under consideration.

This calculable interrelationship can be gathered from FIG. 3. In this figure, the temperature difference between the ambient temperature and the wet-bulb temperature is entered by the system of broken lines at varying ambient temperature and varying relative humidity. The continuous line in the left hand section of the figure shows the icing limit, after which a formation of ice occurs as a result of the water vapor or the water droplets, as the case may be, which are introduced into the inducted air. Such an operating range on the left of this icing line must not be reached during operation of the compressor, since otherwise icing occurs.

In the same representation, limit lines for different RPMs of the compressor from 95% to 100% (with regard to the rated RPM) are entered in the right hand bottom corner. These limit lines specify for the compressor to which they refer the ranges within which the risk of surging occurs. In the example under consideration, this means, for example, that with a RPM of 95% of the rated RPM, ranges which lie on the right hand side of the corresponding limit line must not be allowed to be reached when the evaporative cooling is switched on. Hence, if the environmental conditions, i.e., the ambient temperature and the relative humidity, lie within this range, then no evaporative cooling is operated. On the other hand, in the range to the left of this limit line, there is no risk at all of surging as a result of temperature fluctuations which are caused by the evaporative cooling. In these environmental conditions, the compressor as a result can be safely operated with the evaporative cooling without further temperature control mechanisms.

Figure 4:
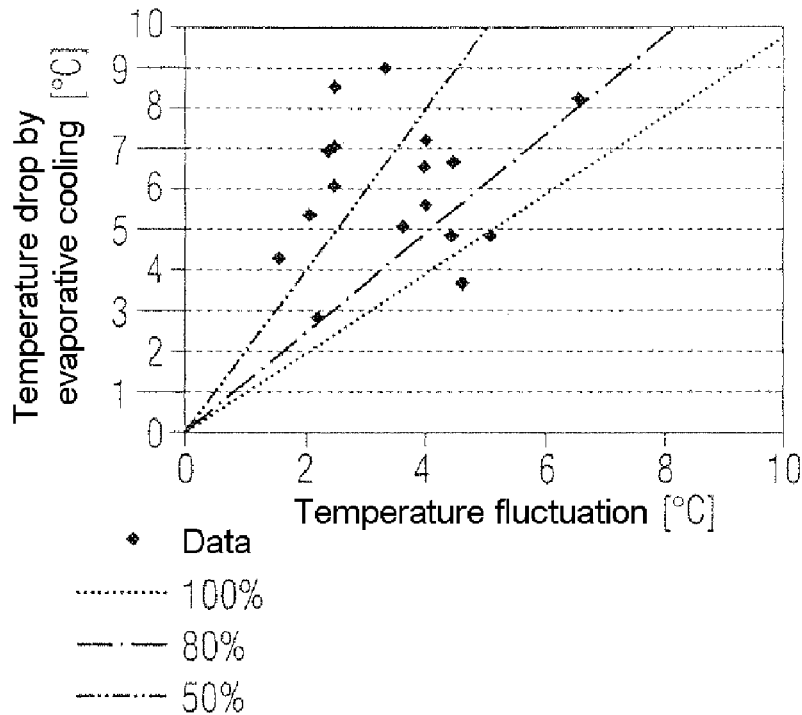
FIG. 4 shows an example for an empirically determined interrelationship between the maximal temperature drop which is achievable by the evaporative cooling, and the temperature fluctuation resulting from it.

With the restriction of the operating range according to FIG. 3, within which the evaporative cooling in the compressor can be operated, it was assumed that the temperature drop achievable by the evaporative cooling leads to temperature fluctuations which correspond to the same temperature difference. This, however, as a rule is not the case, as is shown with reference to FIG. 4. The interrelationship between the temperature drop, which is achievable by the evaporative cooling, and temperature fluctuations which result from it, can be recorded by measurements. From the measurement in FIG. 4, it is shown that the amplitude of the temperature fluctuation which results from the evaporative cooling as a rule is lower than the amplitude of the temperature drop which is achievable by this evaporative cooling. In the figure, in addition to the measured data, the curves are drawn which are produced on the assumption of a resulting temperature fluctuation which corresponds to 50%, 80%, or 100% of the amplitude of the temperature drop which is achievable by the evaporative cooling. It is evident from the figure that the curves at 80% and 50% lie closer to reality than the curve at 100%.

Figure 5:
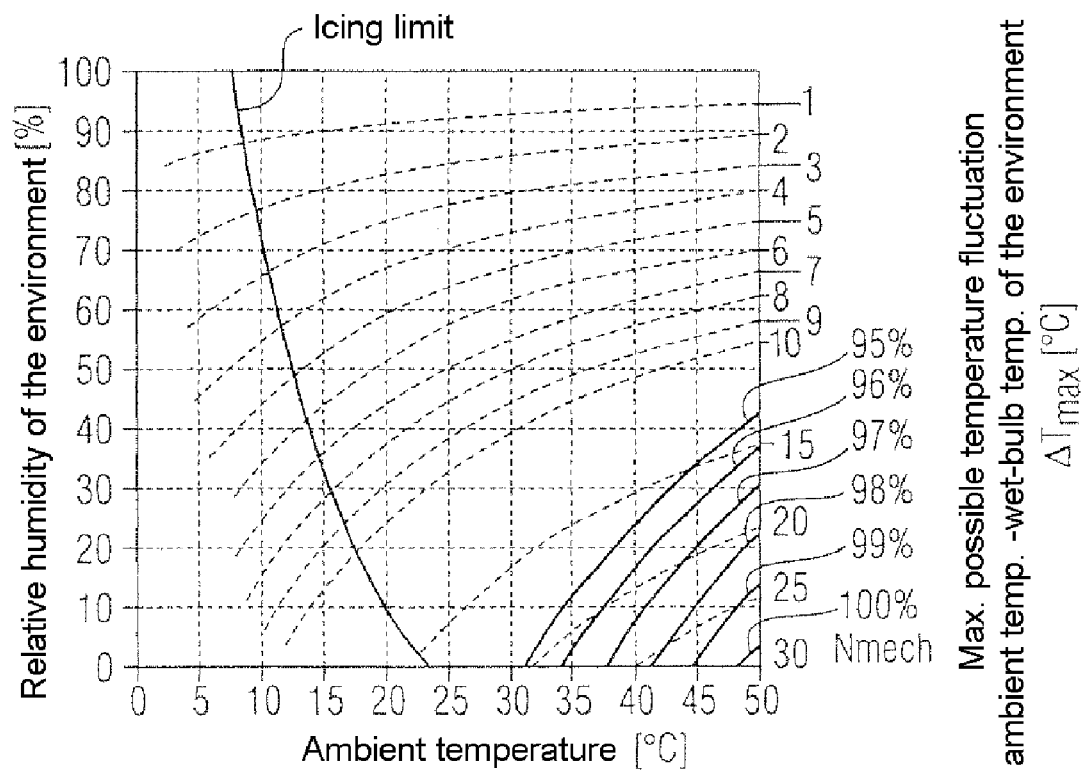
FIG. 5 shows a second example for the limitation of the operating range of the evaporative cooling according to the method under consideration.

Therefore, for the operating mode of a compressor according to the method under consideration, preferably an interrelationship is fixed in which the temperature fluctuation which results from the evaporative cooling corresponds to 80% of the maximum possible temperature drop by means of the evaporative cooling. This is shown in FIG. 5, in which the same data as already described in FIG. 3 are entered. In this case, however, the limitation of the operating range of the evaporative cooling is smaller, so that in the right hand bottom section of the figure a smaller prohibited range is produced, within which the evaporative cooling must not be operated.

During the implementing of the method under consideration in a gas turbine, the injection system of the evaporative cooling should be suitably designed in front of the compressor inlet. For this purpose, the individual nozzles or nozzle stages should be installed symmetrically inside the cross section of the air induction pipe. On the other hand, it is advantageous if the nozzles lie closer to each other in regions of higher flow velocity of the inducted air than in regions of lower flow velocity, so that a maximum uniformity of the saturated flow in the air induction flow ensues. In an air induction pipe of a gas turbine, the higher flow velocities of the inducted air occur mainly in the central region so that in this region there should be a correspondingly closer arrangement of the injection nozzles than in the other regions. Basically, the packing density of the nozzles should enable compliance with the continuity equation $$\dot{m} = \rho \chi \bar{V} \chi A$$

Figure 6:
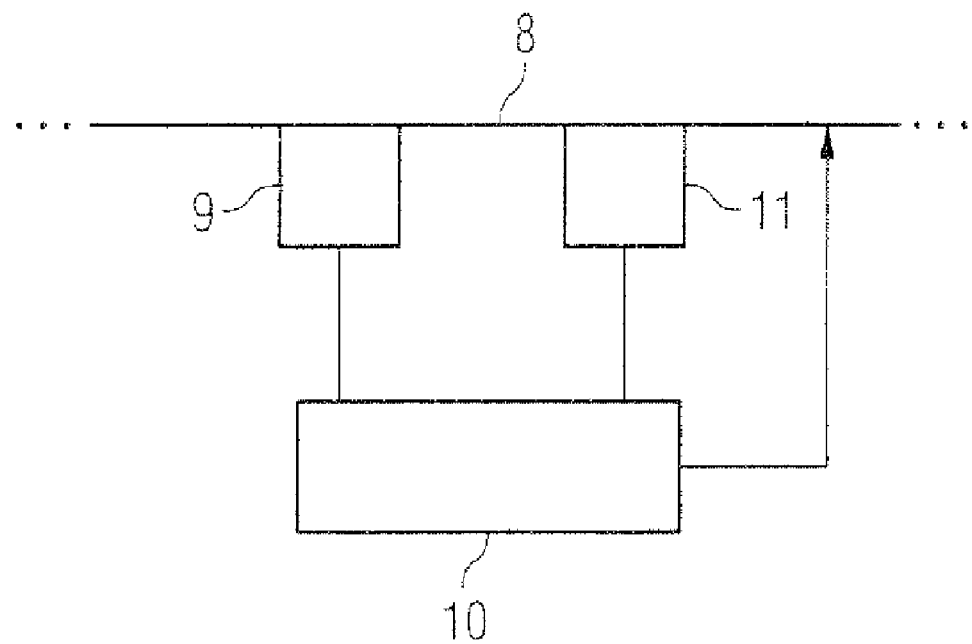
FIG. 6 shows an example for the procedure for monitoring of the evaporative cooling.

FIG. 6 finally schematically shows a further development in which the pressure in the feed line 8 of the evaporative cooling is monitored by a pressure measuring device 9 in order to shut off the feed by a control unit 10 in the event of the exceeding or falling below of a limiting value of this pressure, which preferably lies between $120*10^5$ Pa (120 bar) and $180*10^5$ Pa (180 bar). Furthermore, in the development which is shown, the mass flow in the feed line 8 is measured by a measuring device 11 during operation, and with a difference of more than 5% of a rated value the evaporative cooling is also shut down.

List of Designations
1 Surge limit
2 Operating line
3 Shifted operating line
4 Operating point on the undisturbed operating line
5 Operating point on the shifted operating line
8 Feed line
9 Pressure measuring device
10 Control unit
11 Measuring device for mass flow While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

What is claimed is:

1. A method for operation of a compressor of a gas turbine, in which compressor air inducted from the environment is cooled by means of evaporative cooling before entry into the compressor, the method comprising:

before putting the compressor into service, determining maximum possible temperature drops by evaporative cooling in dependence upon different environmental conditions, as a data record, or as both;

relating the temperature drops to a map of the compressor, from which map maximum temperature fluctuations can be gathered to be observed at different environmental conditions and different RPMs of the compressor to avoid surging; and operating the evaporative cooling only when current environmental conditions produce a maximum possible temperature drop, of which a predetermined fractional part, between 50% and 100%, does not exceed the maximum temperature fluctuation gatherable from the map for these environmental conditions and for the current RPM of the compressor.

2. The method as claimed in claim 1, wherein operating the evaporative cooling is performed only if the current environmental conditions produce a maximum possible temperature drop, of which a fractional part of 80% does not exceed the maximum temperature fluctuation gatherable from the map for the current environmental conditions and the current RPM of the compressor.

3. The method as claimed in claim 1, further comprising:

continuously measuring a temperature and relative humidity of the environment as environmental conditions during operation of the compressor; and shutting down the evaporative cooling upon reaching environmental conditions at which the evaporative cooling is not operated.

4. The method as claimed in claim 1, further comprising:

continuously measuring a pressure of an evaporative medium which is supplied for the evaporative cooling during operation of the compressor; and shutting down the evaporative cooling when said pressure exceeds or falls below predetermined limiting values.

5. The method as claimed in claim 1, further comprising:

continuously measuring a mass flow of an evaporative medium which is supplied for the evaporative cooling; and shutting down the evaporative cooling upon a difference of more than 5% of a predetermined mass flow rated value.

6. The method as claimed in claim 1, wherein injection nozzles are provided for an evaporative medium inside a cross section of an air induction pipe of the compressor, and further comprising:

operating the evaporative cooling at least in part with said injection nozzles so that an evenly saturated flow of the inducted compressor air is achieved over the cross section.

* * * * *